Sept. 30, 1924. 1,510,177
W. LACHMANN
APPARATUS FOR UTILIZING NONCOMPRESSED OXYGEN, ESPECIALLY
IN AUTOGENOUS HIGH TEMPERATURE PROCESSES
Filed Jan. 3, 1921
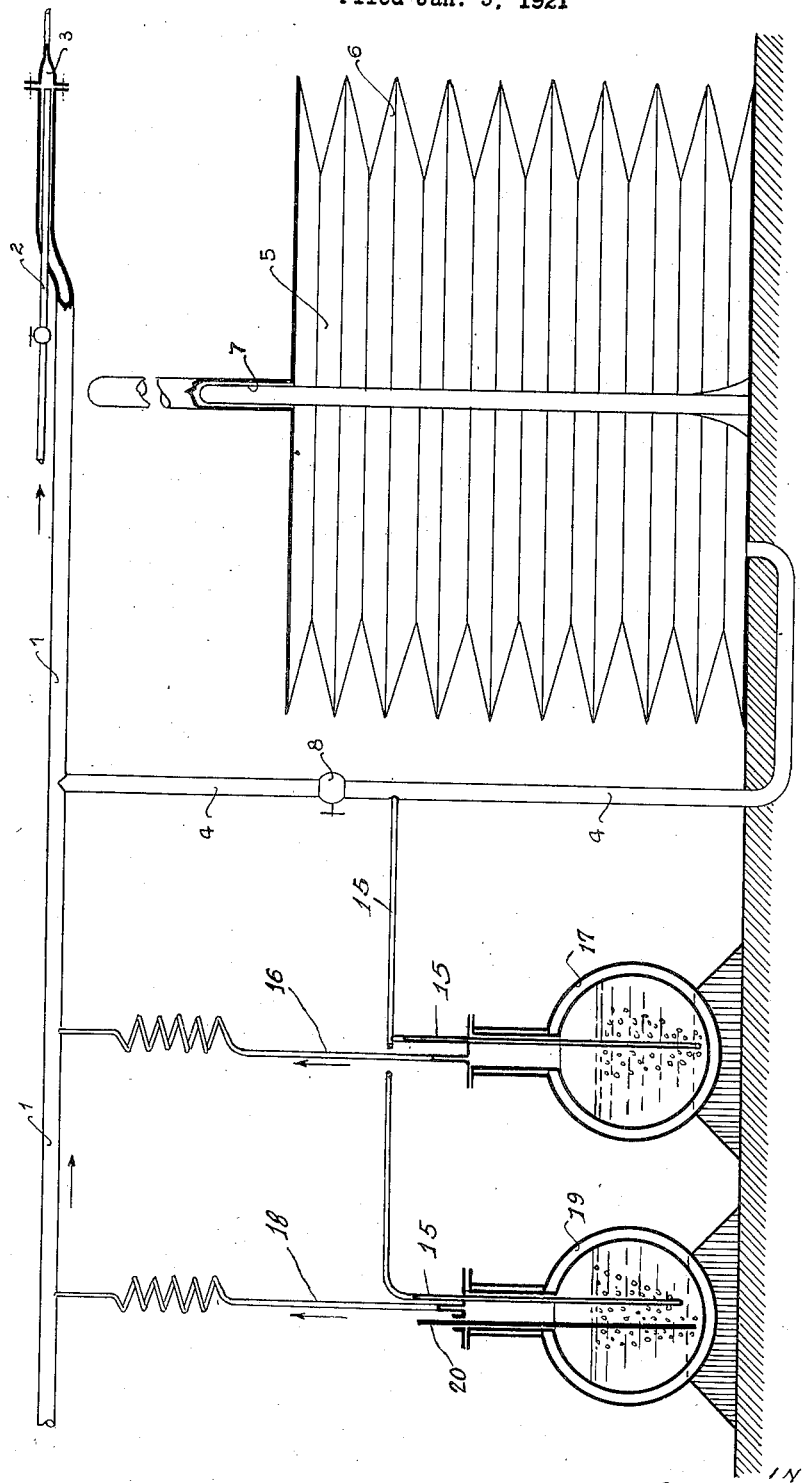
INVENTOR:
Walter Lachmann
BY Wm Wallace White
ATTY.

Patented Sept. 30, 1924.

1,510,177

UNITED STATES PATENT OFFICE.

WALTER LACHMANN, OF DRESDEN, GERMANY.

APPARATUS FOR UTILIZING NONCOMPRESSED OXYGEN, ESPECIALLY IN AUTOGENOUS HIGH-TEMPERATURE PROCESSES.

Application filed January 3, 1921. Serial No. 434,833.

*To all whom it may concern:*

Be it known that I, WALTER LACHMANN, residing at 1, Wormserstrasse, Dresden-A., Saxonia, Germany, have invented certain new and useful Improvements in Apparatus for Utilizing Noncompressed Oxygen, Especially in Autogenous High-Temperature Processes (for which I have obtained Letters Patent of Germany, No. 350,838, dated March 27, 1922, on an application filed October 11, 1918), of which the following is a specification.

Autogenous welding and cutting has hitherto been carried out with highly compressed oxygen which involves considerable expense and trouble on account of the carriage of the oxygen tanks (steel bottles). The object of the invention is to effect an improvement in this respect. This is accomplished by turning non-compressed, more especially liquid oxygen, to account so that mines for example which are equipped with plant for producing blasting air will be enabled to employ their liquid oxygen also for welding and cutting and to obviate the necessity of procuring the oxygen supplied commercially in steel tanks, cylinders or bottles, or of acquiring plant for generating gaseous oxygen.

It is known that liquid oxygen is stored in liquid air vessels which, although they almost entirely prevent evaporation, cannot resist high pressure and hence will not permit of the vaporization of their contents under any appreciable pressure such as for instance 2 atmospheres. But a certain pressure is necessary to impart to the oxygen used for combustion with hydrogen or acetylene a speed of discharge which is high enough to obtain an intense combustion and to prevent back-firing.

The accompanying drawing is a diagrammatic side view of an apparatus embodying the present invention.

As indicated in the drawing the latter difficulty is removed by this invention by using an auxiliary gas (a primary auxiliary gas, in pipe 2), which is more or less compressed, for obtaining a speed of flow that is sufficient for the afore-mentioned purposes. The energy of flow is transferred to the non-compressed oxygen in a manner which is in itself known, viz; by means of injector 3, the compressed auxiliary gas being caused to stream in a fine jet through nozzles situated within a pipe (1) into which the non-compressed oxygen is conducted, the gas jet being thus made to exert a sucking effect on the non-compressed oxygen and to urge the latter along with it. It will be obvious that, inasmuch as the auxiliary gas is under pressure, while the oxygen or main gas is not under pressure, backfiring is thus avoided.

The obvious primary auxiliary gas to employ will be (I) mostly hydrogen, i. e. in all cases where oxygen is burnt with this gas, or (II) if the gas used for combustion with oxygen is acetylene—which, as is well known, is explosive under pressure and must therefore not be used under pressure—compressed auxiliary oxygen. It is true that in the latter case the trouble and cost involved in using steel cylinder oxygen are not entirely done away with, but they are reduced so as to be present only in the smallest possible degree.

As shown in the drawings, the suction pipe 1 through which the non-compressed oxygen is drawn, as hereinbefore stated, communicates with a pipe 4 provided with a valve 8 and which pipe in turn communicates with a gas receptacle 5. The pipe 1 also communicates, by means of coiled tubes 16 and 18, with the gas space above the liquid in the vessels 17 and 19 respectively. By reason of these connections, the vaporized oxygen in the vessels 17 and 19 may be conducted into the receptacle 5 to be utilized as a secondary auxiliary gas, which gas, owing to the construction of the receptacle, is maintained under a slight excess pressure. The vaporization of the liquid oxygen in the vessels 17 and 19 may be facilitated by plunging a rod 20 into said vessels, as shown in connection with the vessel 19, whereby the warmth of the rod assists in vaporizing the liquid oxygen, the amount of vaporization produced by the rod being proportional to the ratio between that portion of the length of the rod submerged in the liquid and that portion extending above the liquid.

The vessels 17 and 19 are placed in constant communication with the receptacle 5 by means of a tube 15 which is provided with a branch extending down nearly to the bottom of the liquid oxygen in each of the vessels 17 and 19.

The operation of the device above described is as follows: When the device is not in use, that is when no gas is being drawn therefrom, the valve 8 is opened, and the vaporized oxygen in the vessels 17 and 19 passes up through the tubes 16 and 18 into pipe 1, and thence through the pipe 4 into the receptacle 5, the top of which gradually rises on the rod 7 and maintains the gas under a certain amount of pressure. As soon as the pressure in the receptacle 5 becomes higher than the normal pressure of the gas passing from the vessels 17 and 19 to the pipe 1, the gas in the receptacle 5 is forced back through the pipe 4 and pipe 1, thus equalizing the pressure in the system. When the apparatus is in operation, the valve 8 is closed, and the valve in the primary auxiliary gas tube 2 is open, whereupon said auxiliary gas causes a suction in the pipe 1, thereby drawing from the gas space in the vessels 17 and 19 the vaporized oxygen that has accumulated therein, and delivering said oxygen through the nozzle 3 to the place of use. As soon as the gas space in the vessels 17 and 19 becomes partially evacuated, the gas in the receptacle 5 will flow through the tube 15 into the vessels 17 and 19 and will bubble up through the liquid oxygen in said vessels and will thus, owing to its warmth, cause comparatively rapid vaporization of said oxygen.

Besides the arrangements described, others, although of a less simple nature, may be devised by which the sucking action that is exerted by the auxiliary gas in expanding is made to cause an influx of exterior heat into, and hence the evaporation of, the liquid oxygen of the liquid air vessel, this resulting further in the flame being supplied with gasified oxygen.

The process embodied in the present invention may be readily extended and adapted for drawing gaseous oxygen from any source whatever, as for example oxygen which is immediately obtained in a gaseous state and stored up in a gaseous state in tanks. Here also the expansion of compressed oxygen or of another auxiliary gas (hydrogen) serves to carry the non-compressed oxygen along with the auxiliary gas and to cause it to be immediately consumed, thus rendering compressors and other accessories unnecessary.

To economize secondary auxiliary oxygen it may be preheated, or vaporizing devices of any known kind may be arranged on the vessel (19) such as a metal rod (20) dipping into the liquid oxygen and extending into the open air so as to conduct the heat of the atmosphere into the liquid. The chief vaporization may then be accomplished by this device and an additional self-regulating vaporization may be brought about by the secondary auxiliary oxygen.

In cases in which the primary auxiliary gas (in pipe 2) is a combustible one and a mixture of the same with oxygen is explosive, it will be necessary to provide a safeguard by causing the gas in pipe 1 to pass through water before it reaches the outlet of the pipe.

The gasholder (5) shown in the drawing is pliable and without a water seal. It is either provided in a known manner with irregular folds of the kind employed in air balloons or (as shown in the drawing), has regular folds 6 (like bellows) and should, if possible, be made of thin, light, gas-tight, pliable and, if need be, elastic material, as balloon cloth for example. As indicated in the drawing a rigid top is employed by which, in conjunction with other devices (not shown), the weight of the gasholder is counter-balanced. 7 is a guide member for guiding the stiff top and consists of a column or rod fixed at the bottom and a pipe attached to the top and adapted to slide up and down on the rod.

The vessels 17, 19 shown in the drawing are of the known double-wall vacuum type. The pipes 16, 18 extending from these vessels are spiral-shaped near to the ends entering the oxygen discharge pipe 1. The purpose of this is to make system of pipes capable of yielding to whatever stresses might arise.

The present invention may also be applied to other processes in which high temperatures are employed and in which the combustion of oxygen or gases rich in oxygen takes place, so that all such processes come within its scope.

I claim:

1. An apparatus for supplying non-compressed oxygen, comprising, in combination, a vessel adapted to contain liquid oxygen, a gas receptacle, a discharge pipe communicating with said vessel, a conduit for establishing communication between said receptacle and discharge pipe, said conduit being also in communication with the vessel, and means in said discharge pipe for inducing a flow of gas from said vessel.

2. An apparatus for supplying non-compressive oxygen, comprising, in combination, a vessel adapted to contain liquid oxygen, a receptacle adapted to contain gas under pressure, communicating means between said receptacle and said vessel and adapted to deliver gas from the receptacle to the vessel adjacent to the bottom thereof, and means for drawing gas from the upper portion of said vessel.

3. Apparatus for utilizing non-compressed oxygen as a combustion agent, comprising a vessel containing liquid and evaporated oxygen, an injector, a suction jet of primary auxiliary gas passing through the said injector, a discharge pipe for conducting the evaporated oxygen from the said vessel to the injector, a gasholder for storing secondary auxiliary gas, and a tube for conducting secondary auxiliary gas into the said liquid oxygen, the outlet of the said tube being near the bottom of the liquid oxygen, whereby in proportion as the evaporated liquid oxygen is sucked from the said vessel by the said suction jet a corresponding quantity of secondary auxiliary gas passes into the liquid oxygen, delivers up its warmth to this oxygen, and causes it to evaporate.

4. Apparatus for utilizing non-compressed oxygen as a combustion agent, comprising a vessel containing liquid and evaporated oxygen, an injector, a suction jet of primary auxiliary gas passing through the said injector, a discharge pipe for conducting the evaporated oxygen from the said vessel to the injector, an evaporating device consisting of a heat conductor for conducting warmth from without into the said liquid oxygen, a gasholder for storing secondary auxiliary gas, and a subsidiary evaporating device consisting of a tube for conducting secondary auxiliary gas into the said liquid oxygen, the outlet of the tube being near the bottom of the liquid oxygen, whereby any deficiency of the warmth supplied from without by the said heat-conductor for the purpose of evaporating the liquid oxygen is automatically supplied by the said secondary auxiliary gas.

In testimony whereof I have signed this specification in the presence of two witnesses.

WALTER LACHMANN.

Witnesses:
Dr. HERMAN HAHLE,
Dr. VOLKMAR KLOOFER.